United States Patent [19]

Greminger, Jr. et al.

[11] 3,879,365

[45] Apr. 22, 1975

[54] HYDROXYETHYL HYDROXYPROPYL METHYLCELLULOSE AS A PROTECTIVE COLLOID IN VINYL CHLORIDE POLYMERIZATION

[75] Inventors: George K. Greminger, Jr.; Earl H. Johnson, both of Midland, Mich.

[73] Assignee: The Dow Chemical Company, Midland, Mich.

[22] Filed: Jan. 7, 1974

[21] Appl. No.: 431,272

[52] U.S. Cl. .............. 260/92.8 R; 260/85.5 XA; 260/85.5 N; 260/87.1; 260/87.5 R; 260/87.7; 260/92.8 W
[51] Int. Cl. ...... C08f 3/30; C08f 15/02; C08f 15/08
[58] Field of Search .................. 260/92.8 W, 92.8 R

[56] References Cited
UNITED STATES PATENTS

| | | |
|---|---|---|
| 3,205,204 | 9/1965 | Heckmaier et al ............ 260/92.8 W |
| 3,701,742 | 10/1972 | Richardson et al. .......... 260/92.8 W |
| 3,709,896 | 1/1973 | Frischkorn et al ................ 260/75 N |
| 3,719,651 | 3/1973 | Greminger et al. ........... 260/92.8 W |

*Primary Examiner*—Harry Wong, Jr.
*Attorney, Agent, or Firm*—Ronald G. Brookens

[57] ABSTRACT

An improvement in the process for preparing polymers from vinyl chloride monomer in suspension comprising the use, as a protective colloid, in the suspension media, of hydroxyethyl hydroxypropyl methylcellulose having a thermal gel point greater than about 70°C, a hydroxyethoxyl substitution of about 10–22 weight percent, a hydroxypropyl substitution of about 14–32 weight percent, a methoxyl substitution of about 6–12.5 weight percent, and a total degree of substitution of greater than about 1.5.

3 Claims, No Drawings

HYDROXYETHYL HYDROXYPROPYL METHYLCELLULOSE AS A PROTECTIVE COLLOID IN VINYL CHLORIDE POLYMERIZATION

BACKGROUND OF THE INVENTION

It is known that vinyl chloride monomer can be polymerized in suspension in the presence of a number of natural and synthetic water-soluble polymers which function as protective colloids in the polymerization process to provide products of desirably uniform particle size distribution. Exemplary of such heretofore preferred prior known protective colloids or dispersing agents are the hydroxypropyl methylcellulose materials as described in U.S. Pat. Nos. 2,538,051 and 3,716,507, and hydroxyethyl methylcellulose as described in pending application Ser. No. 359,179, filed May 11, 1973. These polymers, due to their surface activity in water, are capable of dispersing and stabilizing water immiscible monomers in water and may be classified as weak polymeric surfactants. Like a surfactant, they function by lowering the interfacial tension between monomer and the suspension media, thereby permitting the stabilized monomer to polymerize in a distinct size distribution.

The vinyl chloride polymers made commercially from these referred to protective colloids possess excellent plasticizer absorption but the density of such products is unsatisfactory for the requirements of substantially rigid fabricated items such as pipe. More particularly, such prior known resins fail to provide as high a production rate as is desired and the low density creates problems of raw material flow to the fabricating equipment. These deficiencies have resulted in a demand for higher density resins from the industry. Further, the hydroxypropyl methylcellulose derivatives possess a low thermal gel point which limits the utility of such products in suspension polymerization systems operating at elevated temperatures. The thermal gel point is the temperature at which the methylcellulose derivatives change from a solution to a gel. This change is preceded by a haze point at which the gel structure starts to form. At the haze point, the surface active properties of these methylcellulose products cease. Thus, it would be advantageous to utilize a protective colloid having excellent plasticizer absorption properties and which is capable of producing high density vinyl chloride resins and which, in addition, is characterized by having a thermal gel point near the boiling point of water. It would also be beneficial to utilize a protective colloid having the above properties and, in addition, being readily soluble in alcohols, such as methanol and ethanol which are used in some systems for the suspension polymerization of vinyl chloride polymers.

SUMMARY OF THE INVENTION

The above and related advantages are obtained by utilizing as a protective colloid, in the suspension polymerization of vinyl chloride monomer of a hydroxyethyl hydroxypropyl methylcellulose having a thermal gel point greater than 70°C., a hydroxyethoxyl substitution of about 10–22 weight percent, a hydroxypropyl substitution of about 14–32 weight percent, a methoxyl substitution of about 6–12.5 weight percent and a total degree of substitution of greater than about 1.5.

DESCRIPTION OF THE PREFERRED EMBODIMENTS

A. Ternary Cellulose Ethers - HEHPMC

To achieve the required ternary substitution, a controlled reaction of alkali cellulose with methyl chloride, propylene oxide and ethylene oxide is required. Preferably alkali cellulose prepared by treating finely divided cellulose with about 0.35–0.75 parts of NaOH as a 35–70% aqueous solution is blended with about 0.75–2.0 parts of propylene oxide and about 0.4–1.5 parts of methyl chloride at a temperature below about 40°C. Then the resulting slurry is heated at about 40°–60°C while about 0.5–1.5 parts of ethylene oxide are added gradually. To complete the reaction, the mixture is further heated at about 50°–80°C and then the hydroxyethyl hydroxypropyl methylcellulose product is recovered.

By combining certain levels of hydroxyethyl, hydroxypropyl, and methyl substitution, ternary ethers are obtained with a highly useful combination of properties including the surprising solubility in absolute methanol. Thus, the new ternary cellulose ethers are soluble in water and absolute methanol at room temperature at concentrations of 5 weight percent or more. These products are further characterized by the following properties:

| | |
|---|---|
| Wt. % Methoxyl | 6–12.5%, preferably about 6.5–11.0% |
| Wt. % Hydroxypropyl | 14–32%, preferably about 14.5–27.5% |
| Wt. % Hydroxyethoxyl | 10–22%, preferably about 15.0–22.0% |
| Total DS | >1.5, preferably about 1.7–2.7 |
| Gel Point | >about 70°C, preferably about 70–90°C |

In general, a high hydroxyethyl content favors color compatibility, a high hydroxypropyl content gives desired gel point control, a low methoxyl content improves methanol solubility, and a high total degree of substitution improves enzyme resistance.

The term "total degree of substitution (TDS)" refers to the average total number of cellulosic hydroxyl groups that are substituted per anhydroglucose unit of the cellulose. The maximum possible TDS is 3.0.

B. Etherification Process

The ternary cellulose ethers are prepared by reacting methyl chloride, propylene oxide, and ethylene oxide with alkali cellulose in a pressure reactor in the absence of air at about 40°–60°C. Table I gives the operable and preferred reactant ratios:

| Reactant | Reactant Ratios Parts/Part Cellulose | | Mole/Mole Cellulose | |
|---|---|---|---|---|
| NaOH | 0.35–0.75 | (0.45–0.55) | 1.4–3.0 | (1.8–2.2) |
| Methyl chloride | 0.4–1.5 | (0.8–1.2) | 1.3–4.8 | (2.5–3.8) |
| Propylene oxide | 0.75–2.0 | (1.0–1.75) | 2.0–5.5 | (2.7–4.6) |
| Ethylene oxide | 0.5–1.7 | (0.9–1.5) | 1.8–6.1 | (3.2–5.4) |

Alkali cellulose for the process is prepared by treating cellulose with about 0.35–0.75 parts NaOH/part cellulose (1.4–3.0 moles/mole) added as 35–70% aqueous NaOH at about room temperature. A dip tank as described in Savage U.S. Pat. No. 2,949,452, a spray mixer as described by Erickson U.S. Pat. No. 2,469,764, or a slurry reactor as described by Haskins, e.g., U.S. Pat. No. 2,131,733 are suitable. Contact with air is minimized to reduce viscosity loss.

The reaction is carried out in a pressure reactor in the absence of air. Careful temperature control is essential for uniform substitution. External cooling is normally required. Also excess methyl chloride can be used as a heat transfer and ebullient cooling agent. Other ebullient diluents, such as dimethyl ether or a water soluble organic liquid such as isopropanol or tertiary butanol, can be used to moderate the exothermic reactions.

Because of the greater reactivity of the ethylene oxide, the reactor is generally charged with the major proportion of the methyl chloride and propylene oxide at room temperature and heated to about 40°–50°C before beginning the ethylene oxide addition at a rate sufficient to maintain the desired temperature, usually about 45°–60°C. However, incremental additions of methyl chloride and propylene oxide can also be used.

When the exothermic hydroxyethylation is completed, the reaction can be finished at about 55°–80°C. The overall reaction time may be 4–12 hours. Then the reactor is vented and the product purified by appropriate means.

Products with a thermal gel point below about 90°C can be effectively washed with a limited amount of hot water. The product remains insoluble in the hot brine. Products with a higher gel point can be processed with an organic solvent. After washing, the product may be dried and then optionally granulated, milled, surface treated, or otherwise prepared for the desired end use.

C. Properties and Utility

As described herein, the prescribed hydroxyethyl hydroxypropyl methylcellulose ethers are particularly effective as protective colloids or dispersing agents, for the polymerization of vinyl chloride monomer. Exemplary of other monomeric materials which may be interpolymerized with vinyl chloride are the vinylidene halides such as vinylidene chloride; vinyl alkanoates such as vinyl acetate, vinyl proprionate and the like; and acrylonitrile and methacrylonitrile, and mixtures thereof.

Obtainment of desired polymer particle size and distribution may be realized utilizing the prescribed cellulose ethers in a concentration ranging generally from about 0.05 to 5 percent based on the weight of monomer.

The choice of viscosity will depend upon the system employed. For polymerization of vinyl chloride and vinyl chloride copolymers with monomers such as vinyl acetate, a range of products with viscosities from about 30 to 300 cps. at two percent concentration and 20°C. is preferred. Polymers and copolymers containing significant amounts of vinylidene chloride require somewhat higher viscosity products, e.g., from about 400 to 4000 cps.

Further, as in usual aqueous or alcohol containing suspension polymerization reactions of the type contemplated herein, the polymerization proceeds in the presence of a polymerization catalyst. In this regard, the catalyst isopropyl percarbonate has been found to be effective.

The following example further illustrate the present invention and its advantages. Unless otherwise specified, all parts and percentages are by weight.

EXAMPLE 1

In each of a series of individual experiments a 2-gallon glass-lined reactor fitted with a glass crowfoot agitator, a stainless steel finger baffle and a pressure release valve, was first purged with nitrogen. Thereafter 3,540 grams of demineralized water, and 3.54 grams of surface active agent (representing a 0.2 percent solution of the hereafter identified cellulosic material in water) and 2.34 grams of a 20 percent solution of the catalyst isopropyl peroxydicarbonate in xylene was added. A partial vacuum was then created in the reactor and 1,770 grams of vinyl chloride added with agitation at 225 RPM for 5 minutes. The reactor temperature was brought to 54°C. At 10 pound pressure decrease from maximum pressure, the reaction was placed on full cooling and vented to 0 pounds pressure, then evacuated to 20 inches of mercury.

The polymerized vinyl chloride was removed from the reactor, washed with water then filtered and dried overnight at 50°C.

The following Table I identifies the cellulosic materials used.

TABLE I

| | Colloid Type | | The Invention |
|---|---|---|---|
| | For Comparison | | |
| Sample No. | 1 (HPMC)[1] | 2 (HEMC)[2] | 3 (HEHPMC)[3] |
| % $CH_3$ | 27.0–29.0 | 13 | 6–12.5 |
| % OH (Propyl) | 4.0–7.5 | 0 | 14–32 |
| % OH (Ethoxyl) | 0 | 30 | 10–22 |
| TDS (total degree of substitution) | — | — | 1.5–2.5 |
| Soluble in Methanol (up to 5% conc.) | No | No | Yes |
| Thermal Gel Point | ~65 | >100 | 80–85 |
| 2% Viscosity at 20°C. (cps) | 50 | 15 | 60 |

[1] Hydroxypropyl methylcellulose
[2] Hydroxyethyl methylcellulose
[3] Hydroxyethyl hydroxypropyl methylcellulose The following Table II sets forth the characteristics of the vinyl chloride polymers produced:

TABLE II

| | Polymer Characteristics | | The Invention |
|---|---|---|---|
| | For Comparison | | |
| Sample No. | 1 (HPMC) | 2 (HEMC) | 3 (HEHPMC) |
| % Porosity (by Hg intrusion) | 65 | 48 | 50 |
| Resin Bulk Density (gm/cc) | 0.44 | 0.53 | 0.54 |
| % Plasticizer Absorption (% dioctylphthalate absorbed based on resin weight) | 86 | 50 | 50 |
| Powder Mix Time (minutes) | 5 | 8 | 10 |

TABLE II-Continued

Polymer Characteristics

| Sample No. | For Comparison 1 (HPMC) | 2 (HEMC) | The Invention 3 (HEHPMC) |
|---|---|---|---|
| Screen Analysis (U.S.S.) | | | |
| 30 | 2.07 | 0.14 | 0.70 |
| 40 | 7.77 | 1.13 | 10.42 |
| 60 | 24.92 | 31.86 | 46.06 |
| 80 | 34.21 | 33.65 | 24.10 |
| 100 | 16.43 | 10.86 | 6.72 |
| pan | 14.59 | 22.37 | 12.00 |

The above data illustrate that use of the hydroxyethyl hydroxypropyl methylcellulose which is representative of the present invention provides an excellent blending of the many, often conflicting, properties required of a protective colloid in the manufacture of high density vinyl chloride resins. Further, the prescribed protective colloid is unexpectedly soluble in alcohols such as methanol and ethanol and has a thermal gel point close to the boiling point of water.

What is claimed is:

1. In the process of polymerizing vinyl chloride monomer in suspension in the presence of a protective colloid the improvement consisting of:

using as said protective colloid from about 0.05 to 5 percent based on the weight of monomer of a hydroxyethyl hydroxypropyl methylcellulose ether having a thermal gel point greater than about 70°C., a hydroxyethoxyl content of about 10–22 weight percent, a hydroxypropyl content of about 14–32 weight percent, a methoxyl content of about 6–12.5 weight percent, a total degree of substitution of from greater than about 1.5 up to 3.0. and a viscosity of from about 30 to 4,000 cps at two percent concentration at 20°C. in the polymerization system.

2. The process of claim 1 wherein said hydroxyethyl hydroxypropyl methylcellulose has a thermal gel point of from about 80°–85°C.

3. The process of claim 2 wherein said hydroxyethyl hydroxypropyl methylcellulose has a viscosity of about 60 cps at 2 percent concentration at 20°C. in the polymerization system.

* * * * *